June 11, 1968 T. F. IRVINE ET AL 3,387,333
ELECTRICALLY HEATED MOLD
Filed Jan. 27, 1965 2 Sheets-Sheet 1

INVENTORS.
THEODORE F. IRVINE
WILLIAM C. MAITHONIS
BY
Agent

INVENTORS.
THEODORE F. IRVINE
WILLIAM C. MAITHONIS
BY
George A. Sullivan
Agent

United States Patent Office 3,387,333
Patented June 11, 1968

3,387,333
ELECTRICALLY HEATED MOLD
Theodore F. Irvine, North Hollywood, and William C. Maithonis, Los Angeles, Calif., assignors to Lockheed Aircraft Corporation, Burbank, Calif.
Filed Jan. 27, 1965, Ser. No. 428,298
5 Claims. (Cl. 18—35)

ABSTRACT OF THE DISCLOSURE

An electrically heated mold is provided in which a woven thermally-conductive layer is interposed between a resistance heating element and the mold forming surface for preventing hot spots or thermal gradients at the mold surface. The conductive layer comprises metallic strands for high thermal conductivity interwoven with nonmetallic strands to prevent delamination. A heat reflecting layer is disposed in supporting relationship with respect to the heating element on the side opposite the conductive or heat transfer layer.

---

This invention relates to a device which uniformly transfers heat to a surface such that the surface has the same temperature at all points and there is a minimum temperature differential between a heating element and the surface of the device.

Plastic panels reinforced with a multiplicity of fabric layers such as glass fiber cloth have become increasingly important in industry. In order to produce a strong part that is resistant to fracturing, it is important to keep the amount of plastic used, as an adhesive to bond the reinforcing cloth together, down to a minimum. Frequently, the cloth is preimpregnated with a plastic and dried to a point that the plastic is in a gel state but remains uncured. Once the pre-impregnated cloth layers are precut and shaped to a particular configuration, multi-layers are arranged in the shape of a part and heat is applied to the part in order to cure the plastic.

A heated mold is frequently used to apply heat to a thermosetting plastic impregnated panel in order to both cure and form the part in a traditional manner. The mold supplies heat to the part and a conventional vacuum bag forming apparatus envelopes the mold and the part in order to force the part into intimate contact with the mold during the curing cycle.

In the past, heated molds could not be used for curing and forming parts above particular temperatures, As for example, some plastics must be cured in the range of 350° F. to 400° F. and these molds were unable to withstand sustained heating without delamination or deterioration of the mold surface. It is believed that these failures were caused in part by a large temperature differential between the temperature of a heating element embedded within the mold and the surface of the mold. Basically the problem has been observed in heated molds in that the heating elements embedded within the mold have not uniformly heated the surface of the mold. This type of construction has thereby given non-uniform curing of the plastic parts which could cause deformation or distortion of the plastic panels in the cured state.

Some attempted solutions to the problems in heated molds have been made without apparent success. Metallic powders have been milled into the plastic which is used to impregnate the multiple layers of reinforcing cloth in the mold in an effort to transfer the heat from a heating element to the mold surface and thereby reduce the temperature differential between the heating element and the mold surface. This attempt has been unsuccessful since the metallic particles were not close enough together to transfer the heat rapidly enough. The metallic powders also formed a foreign element within the plastic and which tended to reduce its total strength and adhesive ability; and thus the total amount of metallic powder introduced into the plastic was held to a minimum. Another attempt to solve this problem was to physically insert metallic objects such as screens between the mold surface and the heating element to conduct the heat to the mold surface. This attempt failed because of a practical problem in the inability to tie or interlock the mold surface to the heating element and in practice it was found that delamination between the screen and the plastic occurred and a difficulty in forming a cohesive mass was evident.

In accordance with the present invention, a heated device has been produced in which heat generated by a heating element has been conducted both uniformly and rapidly to a surface. This heat conducting device takes the shape of a series of thermally conductive strands distributed in juxtaposed position as a conductive layer adjacent to the heating element and preferably these strands are interwoven with thermally nonconductive fiber strands. A means for integrating the conductive layers with the heating element takes the form of an adhesive which may be a heat-resistant plastic. The juxtaposed strands of conductive material transfers the heat uniformly from the heating element to the conductive layer and to the surface of the heating device. The structure of the conductive layer also is such that the interwoven nonconductive fibers provide a gripping surface to tie the conductive layer to the heating element through the medium of the adhesive. Preferably, the heating element has a gripping surface thereon which can be impregnated with the adhesive and is used to bond the device into a cohesive mass which is resistant to delamination or deterioration when heated for extended periods.

In terms of structure, the invention is directed to a heat transfer device in which a heating element is disposed adjacent to a conductive layer of fabric being formed in part with a series of conductive strands arranged on the fabric in juxtaposition to uniformly transfer heat through and over the entire conductive layer. A means for integrating the heating element and the conductive fabric layer is used to form the device into a cohesive mass.

The term "heat transfer device" as used in this specification is applied to devices which generate heat and the texture of the device may be rigid, semi-rigid, or flexible and includes such things as molds, dies, heating blankets, autoclaves, and the like.

The term "mold" as used in this specification includes a frame or shaped core in a male or female shape on or around which something is modeled. The term extends to those industrial tools such as jigs, fixtures, dies, and the like.

The term "fabric" as used in this specification extends to any woven, knitted, or felted cloth formed from metallic or nonmetallic strands of synthetic or natural fibers joined together in any homogeneous or nonhomogeneous manner.

The term "fiber" as used in this specification includes any slender thread-like material formed from animal or vegetable tissue and extends to both natural and synthetic materials.

The term "interwoven" as used in this specification means any layer of material or fabric which has been woven together, interlaced, or intertwined so as to be intermingled or intermixed into a mass which stays together or is resistant to being pulled apart.

The term "adhesive" as used in this application means any substance which sticks to itself or when disposed, in other materials, causes those materials to stick together and includes but is not limited to plastics, rubbers, certain organic and hydrocarbon materials, and the like.

The features and advantages of the invention become more apparent upon review of the description and the accompanying drawings in which.

Figure 1:
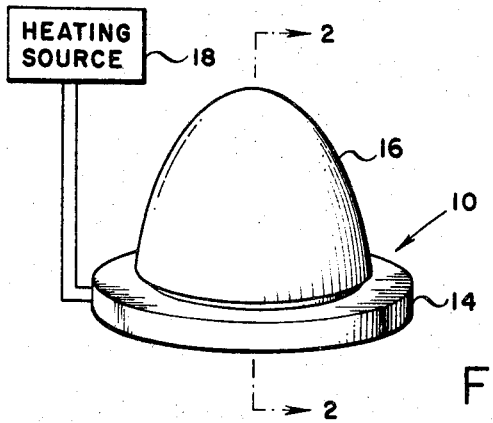
FIGURE 1 is a perspective view of a heated mold constructed in accordance with the present invention.
Figure 2:
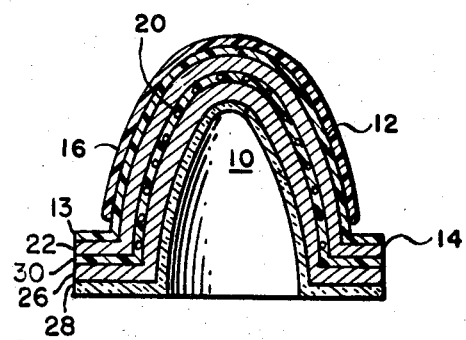
FIGURE 2 is a cross-sectional view taken along line 2—2 of FIGURE 1 and wherein the thicknesses of the lamina are exaggerated for clarity.

Referring now to FIGURES 1 and 2, a heating device in accordance with the present invention is a mold 10 formed in the shape of a hollow dome and including a male-shaped mold forming surface 12 and a reinforcing flange 14 extending from the forming surface. A series of interconnected heating elements 20 are embedded beneath the mold forming surface 12 and are coupled to a heating source 18 which transfers heat to the mold. A plastic panel 16 is draped over the mold forming surface 12 and is cured in place by applying heat from the heating source 18 through the heating elements 20.

The plastic panel 16, cured on a mold according to the invention, is formed from a series of plastic-impregnated layers of fabric (not shown) which are placed upon the mold 10 in a predetermined arrangement. The mold 10 is used to apply heat to the plastic panel and in order to force the panel into intimate contact with the mold, a conventional vacuum-forming bag (not shown) encases the mold and the plastic panel 16 and in a conventional manner, vacuum is applied to the bag to force the part against the mold.

Figure 3:
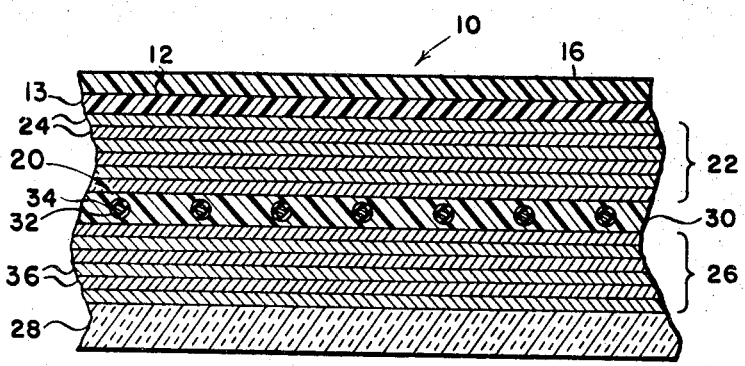
FIGURE 3 is a typical fragmentary cross-sectional view taken through a portion of the mold illustrated in FIGURES 1 and 2 and shows the individual parts in great detail.

Referring now to FIGURE 3, a heating device in the form of the mold 10 in accordance with the present invention is formed from the heating element 20 disposed beneath the mold forming surface 12. A means for conducting heat from the heating elements 20 takes the form of a thermally conductive layer 22 being formed from a multiplicity of layers of conductive fabric 24. A second layer 26, which is nonconductive, is disposed on the opposite side of the heating element 20 and is sandwiched between an asbestos layer 28 that serves to reflect heat toward the mold forming surface 12. A means for integrating the conductive layer 22, the nonconductive layer 26 with the heating element 20 takes the form of an adhesive 30 which impregnates both layers 22 and 26 and ties the mold into a cohesive mass. The conductive layer 22 serves to uniformly distribute heat radiating from the heating elements 20 and for conducting this heat to the forming surface 12. The asbestos layer 28 and the nonconductive layer 26 serve to support the heating element 20, and to reflect the heat toward the mold forming surface 12.

The heating element 20 is formed from a series of continuous resistance wires 32 encased within a fabric tube 34 which extends along the entire length of the heating element. The fabric tube around the wires serves as a gripping surface and the adhesive 30 which impregnates the conductive and nonconductive layers 22 and 26, respectively, serve to also impregnate the tube and bonds the entire mold into a cohesive mass which is resistant to delamination and deterioration.

Figure 5:
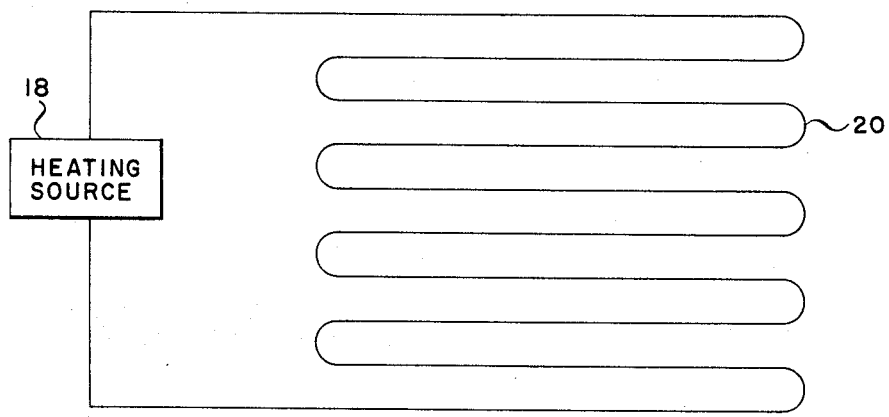
FIGURE 5 is a schematic view of a heating element used in accordance with the present invention.

Referring to FIGURE 5, a schematic form of heating element 20 is shown and represents a continuous conductor connected to a conventional power source 18. The resistance wire within the heating element is then continuous and the voltage drop across the wire serves to generate heat which serves to heat the mold. The heating element is distributed across the entire face of the mold and is arranged in generally a serpentine form although the particular configuration or arrangement of the heating element is not restricted to any shape. The particular arrangement of the wire on the mold forming surface is dictated by the mold shape. A suitable heating element is sold by the Briscoe Manufacturing Company of Columbus, Ohio and this type of heating element has been found to be most satisfactory in fabricating heated molds in accordance with the present invention.

Figure 4:
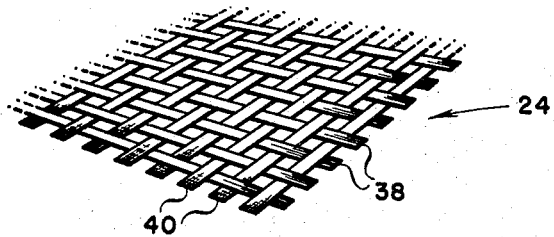
FIGURE 4 is a perspective view of a conductive fabric layer used in the present invention.

The conductive layer 22 is preferably formed from a fabric 24, as shown in FIGURE 4, which includes a series of thermally conductive strands 38 all arranged juxtaposition and held in position by a series of interwoven nonconductive fibers 40. A commercial product commonly known as "gold cloth" is formed from strands of copper wire flashed with metallic gold and has a rectangular cross section that is .015 inch wide and .002 inch thick and disposed adjacent to each other with approximately .005 inch gap. The metallic strands 38 are interwoven with glass fiber strands 40 which are approximately the same size as the metallic strands and form a metallic fabric which readily conducts heat. An advantage in using a conductive layer of this type is that the nonconductive strands are readily impregnated with adhesive which can be adhered to adjacent fabric layers to form the cohesive mass. The type of metallic strands are not limited to any particular material and can include those materials which are high conductors of heat such as platinum, brass, bronze, tin, and the like. The nonconductive strands are preferably made of glass fibers but can include other natural or synthetic materials such as cotton, wool, linen, flax, polyester, acrylic fibers, or the like.

The nonconductive layer 26 is formed from a multiplicity of fabric layers 36 each formed from a fabric which is interwoven in some fashion to prevent the individual layers from falling apart. A preferable nonconductive fabric would be a conventional glass fiber cloth although the particular fiber is chosen merely to affect the amount of strength of the product. Therefore, either natural or synthetic fibers could be used to form the fabric.

In building a mold incorporating the heat transfer device of the invention, the following procedure has been found to be successful. A conventional model (not shown) having a particular configuration to match the mold 10 is prepared and a mold release is applied thereto to permit the mold to be removed after completion. A thin coat of adhesive 13, preferably an epoxy resin is painted upon the model. A layer of glass fiber cloth is impregnated with an epoxy resin and applied to the mold and all wrinkles and air pockets are removed. This procedure is repeated until seven layers of impregnated glass fiber cloth are applied to the mold and the cloth is smoothed to force the layers into intimate contact with the model. A conventional vacuum bag (not shown) is placed over the model and a vacuum is pulled in a conventional manner and concurrently the model is placed within an oven (not shown) at a temperature of 185° F. for one hour. The model with the layers thereon is removed from the oven and paddled or smoothed to remove all entrapped air. The model is then placed in an oven for two and one-half hours at 180° F. and thereafter removed and the vacuum bag is removed. The conductive layer 22 is placed upon the mold and it is preferably applied with alternate layers of conductive fabric and nonconductive fabric. It has been found that the use of alternate layers of conductive and nonconductive fabric to form the conductive layer keeps the layer intact when heated and prevents delamination; thus the alternate layers improve the strength of the mold. It is to be understood that the layers of cloth are tailored according to the shape of the mold such that there is not an overlap or wrinkles formed in the cloth as it is applied to curved surfaces. A series of alternate layers of conductive and nonconductive cloth are applied, each impregnated with epoxy resin, until a total of six layers of each type cloth have been applied. A vacuum bag is placed over the series of layers and the model with the impregnated layers of cloth is placed in an oven and heated at 185° F. for one hour while the model is subjected to a vacuum. The model is removed and the layers are paddled to remove all trapped air. The model is then replaced in the oven for two and one-half hours at 185° F. and thereafter removed. The vacuum bag is then removed and six additional layers of nonconductive glass fiber cloth are applied and impregnated with epoxy resin. The procedure of applying a vacuum bag and heating the laminated layers to cure is repeated.

A performed heating element 20 is placed over the mold and orientated in those areas which are desired to be heated. The electrical continuity of the heater element is checked to be sure that there is no accidental break. A conventional paste-like mixture of epoxy resin filled with a cotton flock or milled glass fibers is applied to the open areas between the heater elements in order to fill any gaps.

The nonconductive layer 26 is then applied by placing two or more layers of impregnated nonconductive glass fiber cloth over the heater elements and the continuity of the heater elements are again checked. These layers of glass fiber cloth are cured using the vacuum bag process in the steps outlined above and the continuity of the heater elements is again checked to be sure that no accidental break has been made. A total of 13 layers of impregnated glass fiber cloth are applied and cured in progressive steps using the vacuum bag process and the procedure outlined above. Three layers of .022 inch thick asbestos cloth are applied and impregnated with an epoxy resin. The resin is cured as in all previous cases using the vacuum bag process and heating in an oven at 185° F. The continuity of the heating elements is again checked. A final postcure of 275° F. for two hours is conducted and thereafter the cure is made at 325° F. for three hours and a final curing of procedures followed for 16 hours at 425° F. The mold is removed from the oven and the vacuum bag is stripped off. A final electrical continuity check is made of the heating elements and the mold is prepared for production by attaching the heating element to a power source and applying temperature sensors within the mold forming surface to be sure that the heating element will not heat the surface of the mold beyond a safe limit such as, for example, 375° F. The temperature sensors and power sources are commercially available and well known in the art and power sources found to be suitable are marketed by the Loyola Company of Los Angeles.

The choice of an adhesive to bond the mold together is dependent upon the maximum temperature to which the mold will be heated. The well known epoxy resins have an advantage in the ability to withstand sustained heat application up to 425° F. for extended periods. Many plastic resin concerns market heat resistant epoxy resin that will withstand such heat applications. Other plastics can be used as an adhesive for the present invention dependent upon the upper limit to which the mold will be heated.

Figure 7:
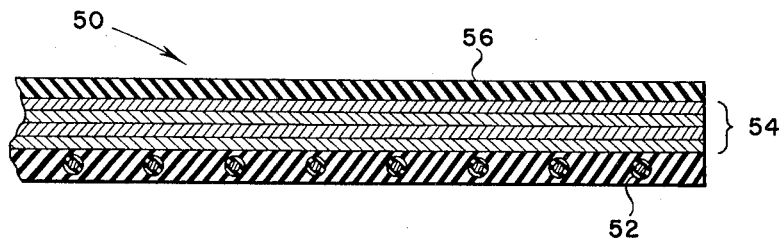
FIGURE 7 is a cross-sectional view taken along line 6—6 of FIGURE 6.
Figure 6:
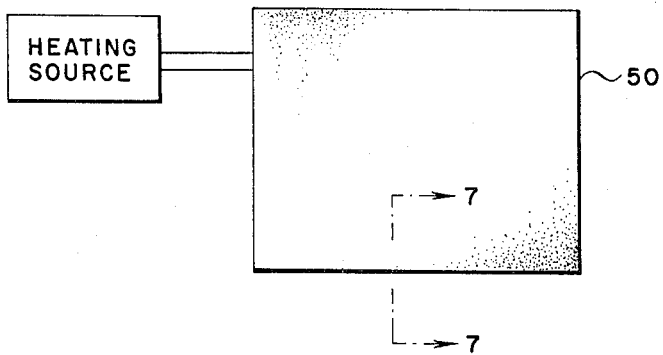
FIGURE 6 is a perspective view of another embodiment of the present invention.

Another embodiment of the present invention omitting the asbestos and non-conductive support layers of the first embodiment is illustrated in FIGURES 6 and 7 wherein the heating device comprises a heating element 52 and conductive layer 54. The heating element 52 and the conductive layer 54 are bonded together by a flexible adhesive such as silicone rubber, a flexible epoxy resin, or a polyester resin. This embodiment is quite similar to the previous embodiment in that the heating element 52 transmits heat to a conductive layer 54 where it is rapidly conducted to the surface 56 and is uniformly distributed throughout the surface. The heating element and the conductive layers are encapsulated with the silicone rubber in a conventional manner. The conductive layer 54 is preferably formed from a conductive fabric such as that illustrated at 24 in FIGURE 4.

While the present invention has been directed to a heating element which has been formed from a resistance wire, this invention extends to heating elements which are formed from hollow tubes or conduits through which steam or hot liquids such as hot water may be passed. Thus the temperature of the heating element may be regulated by the temperature of the fluid which is passed through these tubes. The tube should have a gripping surface such as a series of grooves or ridges that can be used by the adhesive to bond the tube to the remainder of the heating device. An alternative gripping surface can be a fabric that encases the tube much in the same manner as the resistance wire heating element. It is further understood that while a particular conductive fabric has been described and illustrated, other forms of a metallic fabric may be formed from metallic strands interwoven in a nonuniform manner to form a sheet or woven or felted cloth in a manner in accordance with the present invention.

We claim:

1. A mold capable of being internally heated for shaping a plastic part along a mold forming surface comprising:
   resistance heating means having terminals for connection to a source of electrical energy and including an elongate resistance wire encased in a fabric tube and being arranged to heat the entire mold forming surface;
   a thermally conductive fabric layer interposed between said mold forming surface and said heating means, said layer comprising a series of metallic strands in juxtaposition with each other and interwoven with nonconductive fiber strands to form a cloth-like sheet, said metallic strands being used to permit the uniform distribution of heat from the heating means to the mold forming surface, and said nonconductive fiber strands being used to provide the conductive layer with an adhesive bonding surface which is resistant to delamination;
   a thermally nonconductive layer comprising a series of nonconductive fibers interwoven with each other and disposed in supporting relationship with the heating means opposite the conductive layer to reflect heat from said heating means to said thermally conductive layer; and,
   a heat-resistive thermally-conductive plastic impregnating the heating means wire fabric tube and adhesively bonding the tube, the conductive layer, and the nonconductive layer into a cohesive mass, and forming the mold forming surface.

2. A mold as defined in claim 1 wherein said thermally conductive fabric layer comprises a plurality of cloth-like sheets laminated one upon another, each of said sheets having a warp constituted by a series of metallic strands and a weft constituted by a series of glass fiber strands.

3. A mold as defined in claim 2 wherein said metallic strands and said glass fiber strands each comprise ribbons of approximately the same size and of rectangular cross section, and wherein like strands are disposed adjacent each other in side by side relationship with a gap therebetween which is approximately one-third the width of said strands.

4. A mold as defined in claim 1 wherein said thermally nonconductive layer comprises a plurality of sheets of glass fiber cloth laminated one upon another.

5. A mold as defined in claim 1 including an asbestos reflector layer laminated to said thermally nonconductive layer opposite said heating means.

(References on following page)

References Cited

UNITED STATES PATENTS

| | | | |
|---|---|---|---|
| 2,138,217 | 11/1938 | Sutter | 219—345 |
| 2,598,279 | 5/1952 | McKibbin | 165—56 |
| 2,609,316 | 9/1952 | Fichtner | 156—583 |
| 2,802,086 | 8/1957 | Fener | 156—583 |
| 2,817,737 | 12/1957 | Morris | 338—208 |
| 2,879,196 | 3/1959 | Brucker | 156—155 |
| 2,907,070 | 10/1959 | Van Hartesveldt | 18—38 |
| 2,952,001 | 9/1960 | Morey | 338—210 |
| 1,714,693 | 5/1929 | Renwick. | |
| 2,323,478 | 7/1943 | Lobl | 219—529 |
| 2,783,358 | 2/1957 | Wolf | 219—345 |
| 2,844,696 | 7/1958 | Custer | 219—345 |
| 2,859,322 | 11/1958 | Glazier et al. | 338—208 |
| 3,178,560 | 4/1965 | Mapp et al. | 219—528 |

RICHARD M. WOOD, *Primary Examiner.*

V. Y. MAYEWSKY, *Assistant Examiner.*